Dec. 13, 1955   J. H. GISKES ET AL   2,727,226
FAULT DETECTING DEVICE FOR TAPE FEEDERS
Filed Nov. 17, 1952
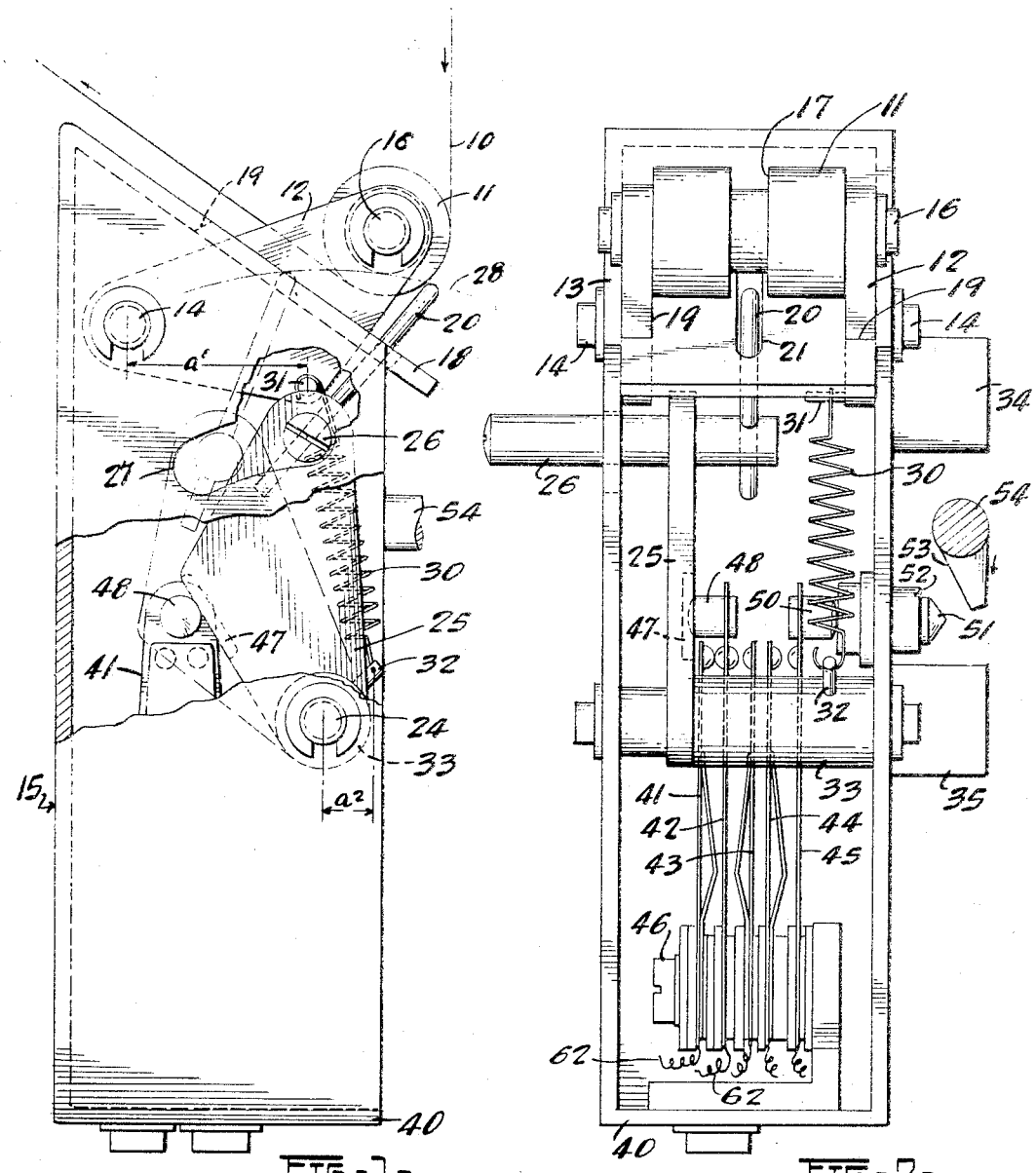
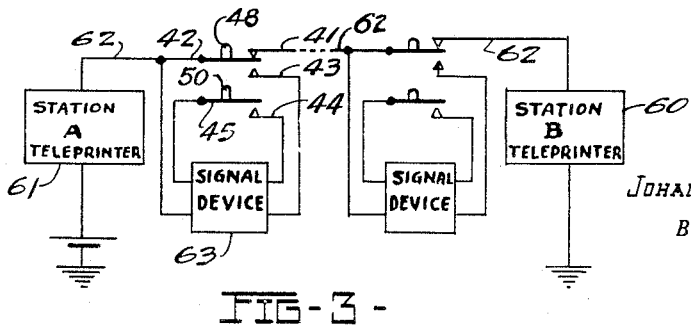
INVENTORS:
JOHANNES HERMANUS GISKES,
CORNELIS SEGAAR.
BY Hugh A. Kirk
ATTY.

United States Patent Office 2,727,226
Patented Dec. 13, 1955

2,727,226

FAULT DETECTING DEVICE FOR TAPE FEEDERS

Johannes Hermanus Giskes, Delft, and Cornelis Segaar, The Hague, Netherlands, assignors to Staatsbedrijf der Posterijen, Telegrafie en Telefonie, The Hague, Netherlands Application November 17, 1952, Serial No. 320,878

11 Claims. (Cl. 340—259)

This invention relates to a fault detecting device for tape type feeders. More particularly, it deals with a device which will signal faults in the continuous feeding of a tape to a machine, such as for example through a teleprinter or automatic telegraph receiver on which tape messages are recorded, and to detect faults in the tape which would mutilate the message or cause the message to be lost.

It is an object of this invention to produce a simple, efficient, effective and economic tape fault detecting and signalling device which is responsive both to the absence of the tape as well as to too much tension in the tape being fed through a machine.

Another object is to produce such a device for automatic teleprinters that record signals on a tape, which device will prevent the mutilation and/or loss of signals recorded on such a tape, and which is responsive also to signal an operator of the existence of one of these faulty conditions so that it promptly can be corrected. Such faults include the insufficient advance of the tape through a tape feeder and exhaustion or the breaking of the tape, and may be caused by the resistances in the guides for the tape, the installing of a feed roll of tape in an improper manner, the sticking of tape, bad spots in the tape, and coming to the end of the tape.

Generally speaking, the tape fault detecting device of this invention comprises an idler guide roller around which the tape passes, which roller is mounted on a lever, the position of which lever is determined by tension in the tape; and a second lever which feels both the presence of the tape on the roller and the proper position of the roller, and which second lever is connected to operate an alarm or signalling device in the event the proper conditions for the tape do not exist. A resilient means is provided between the two levers to maintain them in proper operating condition when the tape is not faulty, and to move them when a fault occurs in the tape. The difference in the respective lever arms of the lever for the roller and that for the feeder together with the tension of the spring are calculated to be within the range of the maximum amount of resistance that the tape must overcome in its guides and the tensile strength of the tape itself. That is, when the tension in the tape is above that required to overcome the resistance of the guides and approaches that of its own breaking point, then the guide roller of this device will be moved from its normal position so that the feeler against the roller will also be moved to operate the signalling device. In the event there is no tape at all around the guide roller of this device, a groove is provided below the feelers in the roller through which the feeler may pass to move the second lever to operate the signal device.

The second lever in its motion may operate parallel electrical spring contacts which are connected to a signal device or an alarm which may be visual, audible, or both. These contacts of separate devices in a system or network may be connected in series with two or more teleprinters so that when one of them is operated, it will break the circuit for both the transmitting and receiving teleprinters at different stations, and stop them until the tape fault is repaired.

There also may be located in the device of this invention a pair of spring contacts which may be operated by a third lever arm connected to the supply roll for the tape, which lever arm is responsive to the decrease of tape remaining on the supply roll and operates the other pair of spring contacts just before or when the supply of tape is exhausted from the roll.

The above mentioned and other features and objects of this invention and the manner of attaining them will become more apparent and the invention itself will be best understood by reference to the following description of an embodiment of the invention taken in conjunction with the accompanying drawings, wherein:

Fig. 1 is a side elevation with parts broken away of the one embodiment of the device of this invention as adapted for the feeding of a paper tape through a teleprinter machine;

Fig. 2 is an end view of the device of Fig. 1 taken from the right;

Fig. 3 is a schematic wiring diagram of how the devices of Fig. 1 may be connected into an automatic teleprinter network.

The detecting

Referring to Figs. 1 and 2, the fault to be detected by the device of this invention resides in the tension or presence of the tape 10 around an idler roller 11 which may be supported by a pair of levers 12 and 13 mounted on a pivoted shaft 14 in a housing 15, in which housing the mechanism of the present device is assembled. The idler roller 11 may be mounted on a shaft 16 for free rotation, which shaft joins the ends of the pair of the levers 12 and 13. The center portion of the roller 11 is provided with a groove 17 for free passage therethrough of the feeler lever 20, when no tape is around the roller bridging the groove, as will be described later. The housing 15 may be provided with a cover plate 18 in which are provided slots 19 and 21 for the levers 12, 13 and 20, respectively, to freely project therethrough and in which their movements are limited.

Mounted in the housing 15 on a second shaft 24 is another or second lever 25 which adjustably supports the feeler 20. The angle and projection of the feeler lever 20 may be adjusted by means of the screw fitting 26, which may project through an arcuate slot 27 in the side of the housing 15 according to the tension in the tape permissible for each machine to prevent overlapping of the signals printed on the tape or the breaking of the tape. The feeler lever 20 detects the presence of the tape 10 around the roller 11 as well as the position of the roller 11. In the event the tape 10 is not present around the roller 11 the feeler 20 then passes through the groove 17 in the roller 11 into the dotted line position shown in Fig. 1, the end of the feeler arm 20 passing through the arc 28 whose center is the center of the pivot shaft 24, the adjusting pin 26 thus moving to the other end of the arcuate slot 27.

Between the levers 12, 13 and 25 there is provided a resilient means or spring 30 which is fastened to the levers 12 and 13 on a pin 31, and to lever 25 by a short pin 32 extending slightly from the center of the pivot shaft 24 which is fastened by a sleeve 33 to the lever 25. Thus, the effective lever arm for the levers 12, 13 and 25 due to the tension spring 30, correspond to their effective radii $a1$ and $a2$, which are the radial distances of the connections of the resilient means 30 from the corresponding pivotal shafts 14 and 24. It can thus be seen that the force on the levers 12, 13 is much greater because of the longer lever arm $a1$ than that on the lever arm 25 which has a very short comparative radius $a2$.

Accordingly, the tension in the tape 10 which is required to lift the roller 11 to rotate the lever arms 12, 13 counterclockwise around the pivot 14, is much greater than the force required to maintain the feeler arm 20 in the full line position shown in Fig. 1, but the force operating the feeler 20 is sufficient to maintain it in contact with the surface of the tape 10, but not sufficient so that it will puncture the tape and fall through the groove 17 as long as the tape 10 is present around the roller 11 to bridge the groove 17.

In Fig. 2 there are shown mounted on one side of the housing 15 mounting supporting sleeves 34 and 35, which may be internally threaded for screw mounting the device on the side of the teleprinter between the roll magazine for the tape and the tape feeding device.

The signalling

Mounted on the base 14 of the housing 15 may be a stack of leaf springs and their contacts 41, 42, 43, 44 and 45 which may be insulated from each other and anchored on a common pair of screws 46. The first three of these spring contacts 41, 42 and 43 may be operated by the movement of the lever 25 which may be provided with a cam surface 47 that moves against a projection 48 connected to the center spring contact 42, to break the contacts between spring contacts 41 and 42 and make the contact between springs 42 and 43.

If desired, the additional contacts 44 and 45 may be operated through a projection 50 mounted on the spring contact 45, which cooperates with a sliding pin 51 mounted in a guide sleeve 52 in the side of the housing 15, which guide pin 51 may cooperate with the cam surface 53 of a lever 54, which lever 54 may be operated by the presence of tape on a nearby supply roll (not shown), and which lever 54 moves to slide the pin 51 to the left in Fig. 2, to close the contacts 44 and 45, and give an alarm when the supply of tape on the roll (not shown) is at or near its end, or is substantially depleted.

The circuit

Referring now to Fig. 3, there is a schematic wiring diagram showing how the plurality of the devices shown in Figs. 1 and 2 with their electrical contacts 41, 42, 43, 44 and 45 may be connected into an automatic teleprinting network in which a sending station B at 60 may be transmitting signals to a receiving station A at 61 and have these stations connected in series through a conductor wire 62 through contacts 41 and 42 of the signal devices of this invention at each station A and station B, so that when contacts 41 and 42 are broken at either station, both the teleprinter at station A and teleprinter at station B are stopped by breaking the circuit 62, and simultaneously an alarm device 63 connected between contacts 42 and 43 is energized to signal the operator at the corresponding station that a fault has occurred in the tape. If desired, the same alarm device 63 may respond to the closing of the contacts 44 and 45 in the event that the supply of the tape at the corresponding teleprinter has been depleted. However, this circuit does not necessarily have to shut-off the teleprinter, which may be done by the operator if such is necessary before the new supply of tape is installed.

The operation

When the tape 10 is in normal tension around the roller 11, the levers 12, 13 and 25 are in the full line position shown in Fig. 1, with the cam surface 47 of the lever 25 out of contact with the pin 48, so that the spring contacts 41 and 42 are closed as shown in Fig. 2. In the event tension in the direction of arrows around roller 10 becomes too great and the levers 12, 13 are rotated counterclockwise around their pivot 14 against the action of the spring 30, the feeler 20 is thereby permitted to pass under the roller along its arc 28 by the action of the same spring 30 so that its cam surface 47 will contact the projection 48 and open the contacts 41 and 42 and close contacts 42 and 43 to operate a signal device 63. The signal thus warns the operator at the station that a fault has occurred in the tape and he must attend the machine to immediately correct the fault so that the message will not be lost, after which he manually resets the device and levers 12, 13 and 25 as shown in Fig. 1.

In the event the tape does break, and therefore does not pass around the roller 10, the roller 10 remains in the position shown in Fig. 1, but then the feeler 20 moves under the action of spring 31 to pass through the groove 17 along the arcuate line 28 to its dotted-line position shown in Fig. 1, and similarly operate the contacts 41, 42 and 43 as described above. Thus the device of this invention not only may be adjusted to detect the tension in the tape, but also is responsive similarly to the absence of the tape around the roller 11.

Usually the device of this invention is placed in the path of the tape between the feeder to the teleprinter and its supply roll from which the tape is taken; however, the device may be placed anywhere along the tape circuit that may be desired.

Although a pair of levers 12 and 13 are shown in the particular device of this invention, a single lever may be employed without departing from the scope of this invention. Also the configuration of the levers may be changed to be adapted to any particular tape feeding system in which a signal of the condition of the tape and tension therein is required.

While there is described above the principles of this invention in connection with specific apparatus, it is to be clearly understood that this description is made only by way of example and not as a limitation to the scope of this invention.

What is claimed is:

1. A signalling device for determining tension and presence of a flexible linear material passing a given station, comprising: an idler guide roller for changing the direction of said material having a normal working position, a first pivoted lever for supporting said guide roller, a material engaging feeler pin having a normal working and a resting position, a second pivoted lever for supporting said pin, a resilient means normally urging said pin lever against said material on said roller, and signalling means responsive to the movement of said second lever when said levers move from their normal working positions.

2. A device according to claim 1 wherein said resilient means is connected between said levers.

3. A device according to claim 2 wherein the effective lever arms acted on by said resilient means is greater for said first pivoted lever than for said second pivoted lever.

4. A device according to claim 1 wherein said roller is provided with a groove through which said feeler pin is free to pass when said flexible linear material is not around said roller and contacted by said pin.

5. A device according to claim 1 wherein said signalling means comprises a pair of electrical contacts.

6. A signalling device according to claim 1 adapted for an automatic teleprinter circuit, wherein said flexible material is a paper teleprinter recording tape.

7. A signalling device according to claim 1 including a means responsive to the depletion of the flexible material from a supply roll.

8. A detecting device for determining the tension in a tape passing a given point, comprising: an idler roller around which the tape passes, a lever on which said roller is mounted, a feeler lever engageable with the tape as it passes said roller, a resilient means connected between said levers to axial position said levers to engage said tape between said roller and said feeler, and means operated by said feeler lever responsive to the change in axial position of said roller, whereby the position of said roller responds to the tension in said tape passing around said roller.

9. A detecting device for determining the presence of a tape passing a given point, comprising: an idler roller around which the tape passes, a lever on which said roller is mounted, a feeler lever engageable with the tape as it passes said roller, a resilient means connected between said levers to position said levers to engage said tape between said roller and said feeler and to move said feeler lever, said roller having a groove therein permitting the unobstructed movement of said feeler when said tape is not around said roller, and means operated by the movement of said feeler lever responsive to the absence of said tape around said roller.

10. A detecting device for determining the tension and presence of a tape passing a given point, comprising: an idler roller around which the tape passes, a lever on which said roller is mounted, a feeler lever engageable with the tape as it passes said roller, a resilient means connected between said levers to position said levers to engage said tape between said roller and said feeler and to move said feeler lever, said roller having a groove therein for permitting the unobstructed movement of said feeler when said tape is absent from around said roller, and signal means operated by the movement of said feeler lever responsive to said feeler lever moving under the action of said resilient means to indicate either the change in position of said roller or the absence of said tape around said roller.

11. A detecting device for determining the tension and presence of a tape passing a given point, comprising: an idler roller around which the tape passes, a lever on which said roller is mounted, a feeler lever engageable with the tape as it passes said roller, a resilient means connected between said levers to position said levers to engage said tape between said roller and said feeler and to move said feeler lever, and signal means operated by the movement of said feeler lever, whereby said feeler lever detects the presence of said tape around said roller and detects the position of said roller, and the position of said roller detects the tension in said tape.

References Cited in the file of this patent

UNITED STATES PATENTS

| | | |
|---|---|---|
| 1,190,053 | Wescott | July 4, 1916 |
| 1,478,775 | Strole | Dec. 25, 1923 |
| 2,410,521 | Potts | Nov. 5, 1946 |
| 2,418,464 | Corwin | Apr. 8, 1947 |
| 2,649,517 | Egan | Aug. 18, 1953 |

FOREIGN PATENTS

| | | |
|---|---|---|
| 788,906 | France | Aug. 5, 1935 |